July 26, 1949. F. M. JONES 2,477,377
MEANS FOR THERMOSTATICALLY OPERATING GAS ENGINES
Filed Nov. 15, 1943
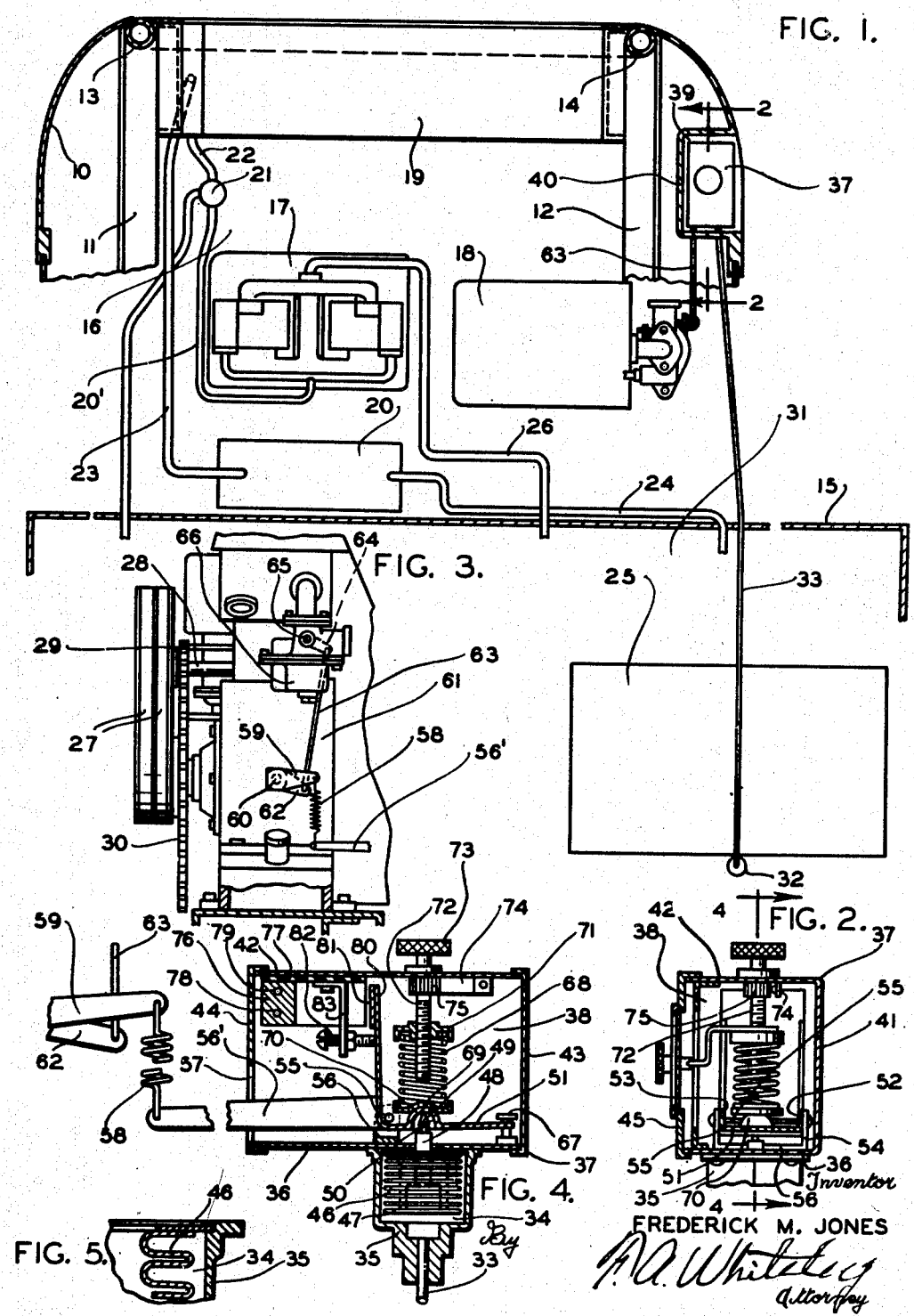

Patented July 26, 1949

2,477,377

UNITED STATES PATENT OFFICE 2,477,377

MEANS FOR THERMOSTATICALLY OPERATING GAS ENGINES

Frederick M. Jones, Minneapolis, Minn., assignor, by mesne assignments, to U. S. Thermo Control Co., Minneapolis, Minn., a corporation of Minnesota Application November 15, 1943, Serial No. 510,432

5 Claims. (Cl. 62—4)

My invention relates to means for thermostatically operating a gas engine wherein a thermostat subject to the temperature condition of a space effects actuation of the throttle of a gas engine to cause operation thereof from high speed operation through various intermediate speeds of operation to low speed or idling operation.

My invention relates to operation of a gas engine employed to control or operate instrumentalities for air conditioning of a given space, such as a condenser and related parts and an evaporator heat exchanger and related parts, all of which are well known and need not be specifically described herein.

In general instrumentalities for cooling air conditioning are employed for cooling fixed spaces, such as rooms of buildings where the power plants may be electric motors of sufficient capacity for the work to be done, and the control of such motors is effected in a customary way by thermostats opening or closing a switch or switches. Where, however, the space is a moving space, such particularly as the storage compartment of a transport vehicle, electric current to operate sufficiently large electric motors is not available. In such cases the power to operate the air conditioning instrumentalities must be furnished by other means than an electric motor, and a preferred and usual means of so operating these instrumentalities is through the use of a gas engine. Customarily the gas engine may be started or stopped through the intervention of a thermostat controlled switch which is opened and closed in response to changes in temperature, but the starting and stopping of a gas engine involves very considerable difficulties which may result in its becoming inoperative. Moreover with such thermostatic controls the gas engine can only operate at full maximum speed which may be undesirable in certain types of air conditioning.

Moreover, even where a large volume of electric current is available, there are conditions in which the use of a gas engine will bring better results than the use of electric motors. These conditions may apply in the air conditioning of habitable spaces, such for example as theatre rooms, rooms of stores, and similar spaces. In these spaces it is very desirable to keep the temperature always constant. Where a gas engine is employed to furnish the power, and is used with the present invention, since the gas engine is operating all the time the noticeable drops and raises in temperature which take place with thermostat controlled electric motors will be avoided.

To meet all these difficulties and to accomplish the desired ends I have conceived a means for controlling a constantly operating gas engine through thermostatic control of the throttle enabling the gas engine to operate at a maximum speed, at various intermediate speeds, and down to the lowest or idling speed, yet never be completely stopped, so that the gas engine does not, during operation over any extended period, need to be started.

It is the principal object of my invention therefore to provide for operating such air conditioning instrumentalities a gas engine power plant wherein fuel is supplied from the carburetor for high speed and for intermediate speeds and for low speed and idling, and to provide automatic means controlled by the temperature in the space being air conditioned for effecting automatic shifting of the carburetor throttle from its low feed to its high feed positions or from its high feed to its low feed position and where desired throughout the range of the intermediate feed positions between the high feed position and the low speed position.

It is a further object of my invention to provide a gas engine power plant with means including a fuel supply carburetor and a controlling throttle therein for maintaining the power plant in continuous operation, said means including thermostatic controlled automatic operation of the carburetor throttle to cause the gas engine to operate at a low speed for substantially non-cooling idling and at various higher speeds for different degrees of cooling operation of the compressor.

It is a further object of my invention to provide automatic means controlled by the temperature of the air in the space being air conditioned for automatically effecting shifting of the carburetor throttle to effect substantial non-cooling when the temperature reaches a predetermined minimum within the storage compartment, and for shifting the carburetor throttle to effect high cooling speed when the temperature within the storage compartment reaches a point above the minimum high temperature.

It is a further object of my invention to cause operation of the carburetor to effect change of engine speed by mens of a gas filled thermostatic member located within the space being air conditioned and to provide means whereby expansion and contraction of the gas in said member, due to changes in temperature, will cause the member to actuate a lever system for shifting the carburetor throttle from one to the other of its operative positions and vice versa, or where desired to successive operative positions for varied speeds from idling speed to high speed.

It is a further object of my invention to employ magnetic means to aid said shifting and to maintain the conditioning parts in fixed position, where changes from minimum to maximum speed of the engine is desired, until change in temperature by reduction or increase of pressure contacting the expansion member can effect instantaneous shift of the carburetor throttle.

This application is a continuation in part of my application, Serial No. 404,596, filed July 30, 1941, which has eventuated into Patent No. 2,336,735.

The full object and advantages of my invention will appear from the detailed description in the appended specification, and the novel features of the invention from which the advantageous results thereof are obtained will be particularly pointed out in the claims.

In the drawings:

Fig. 1 is a diagrammatic part sectional plan view showing the relation of the different parts with particular reference to the means for controlling operation of the gas engine.

Fig. 2 is a sectional view taken on line 2—2 of Fig. 1.

Fig. 3 is a side view of some of the parts shown in Fig. 1.

Fig. 4 is a sectional view of the carburetor control mechanism taken on line 4—4 of Fig. 2.

Fig. 5 is an enlarged fragmentary sectional view through a corner of the gas filled chamber.

As illustrated in the diagrammatic showing of Fig. 1, a casing 10 is indicated as being supported by frame pieces 11 and 12 and corner posts 13 and 14, which casing is merely typical of any casing holding a series of air conditioning instrumentalities adapted to be positioned upon the outside as the front 15 of a compartment to be air conditioned such as the compartment of a transport vehicle. Within a chamber 16 formed in casing 10 is mounted typical apparatus for producing compressed fluid used in cooling air conditioning. These instrumentalities being a compressor 17, a motor 18, for driving the compressor through connection not shown in the diagram, a condenser 19 and a refrigerant tank 20. Refrigerant goes from the compressor through pipes 20', reversing valve 21, pipe 22, condenser 19 and pipe 23 to the storage tank 20 and from storage tank 20 through pipe 24 to the evaporator heat exchanger indicated diagrammatically at 25 returning therefrom to the compressor through pipe 26. The driving means for the compressor is shown in Fig. 3, which operates through a belt and pulley arrangement 27 and drives the compressor. The starter is operated by shaft 28 and pinion 29 thereon driven by gear 30 on the crankshaft of the gas engine. Fans or blowers, not shown give required movements to the air.

All of these instrumentalities are, or may be, of standard construction, the invention residing in the means for controlling operation of the gas engine through operation of the carburetor throttle.

At any convenient point within chamber 31, as for example, in the current of air passing from the chamber into and through the evaporator heat exchanger 25, a thermostat 32 is located. This thermostat is of a standard gas expansion type, in which the gas therein expands and contracts as temperature rises or lowers. The thermostat 32 is connected by means of a tube 33 of small internal bore with a chamber 34, as shown in Fig. 4, formed in a casing 35 which is secured in air-tight relation against a casing 37 forming a second chamber 38. The casing 37 is mounted within a chamber 39 formed by inwardly extending protector member 40, as shown in Fig. 1. The bottom wall 36 of the casing 37, as shown in Fig. 2 is part of a U piece forming a rear side wall 41 and a top wall 42 of chamber 38. The walls 43 and 44 and front side wall 45 complete the enclosure of the chamber 38. In chamber 34 is mounted an accordion plaited bellows 46, which is open at its interior to outside atmosphere and is subject on its outside to the pressure in chamber 34 from pipe 33.

Upon the base plate 47 of bellows 46 and extending through the inside thereof and through the bottom wall 36 is a plunger 48 having a pointed end 49 which engages the inside of a cup-like impression 50 in a lever arm 51. This lever arm 51 is provided with a pair of ears 52 and 53 which come between corresponding ears 54 and 55 on a piece 56 secured to the bottom wall 36, as shown in Figs. 2 and 4. A pin 55' extends through the sets of ears 52 and 54 and 53 and 55, thus pivoting the lever arm 51 for rocking movements.

To the lever arm 51 is secured a long lever arm 56' which passes through a slot 57 in end wall 44. To the extended end of lever arm 56' is secured a spring link 58, as shown in Figs. 3 and 4, which has attached to its other end a short lever arm 59 pivotedly mounted at 60 upon the engine crankshaft casing 61. Movable together with lever arm 59 is a second lever 62 which is connected by a link 63, with the throttle arm 64 on the throttle shaft 65 of the carburetor 66. The operation of these parts is as follows:

When gas pressure in chamber 34 exceeds atmospheric pressure the bellows 46 will tend to be collapsed, thrusting upward on the plunger 48 and its point 49. This will rock the lever 51 in a direction to pull down long lever 56', which through the spring link 58, rocking levers 59 and 62, and link 63, will thrust the throttle arm 64 in a direction to open the throttle and increase the speed of the engine. An adjustable stop screw 67 in the chamber 38, Fig. 4, will limit the movement of the lever 51 to a point corresponding to the maximum speed of the gas engine.

A spring 68 engages a cup washer 69 resting upon the protruding portion 70 on lever arm 51 and is received at its other end by a second cup washer 71, which is threaded upon a screw 72, operable by a thumb nut 73. A detent 74 engages a ratchet 75 to hold the adjusted parts where set. By this means may be determined the temperature at which the bellows will be caused to move the throttle to a higher speed position.

In certain types of operation it may be desirable for the carburetor to have a snap opening to the maximum speed position and instantaneous closing to idling position. For this purpose I may provide an electric magnet 76 within chamber 38 insulated at 77 from the casing wall and supplied with current in a customary manner by wires 78 and 79, the current being adapted to be switched off or on in a usual manner, not shown. An arm 80 is fast on the arm 51 and stands substantially at right angles thereto, and carries an armature 81, subject to the action of the magnet. An adjusting screw 82 on a bracket 83 engages the arm 80 and holds it in the position of maximum opening, a position such that the connecting lever system will have opened the throttle to its maximum engine speed position.

In operation when the lever arm 51 is moved by compression of the bellows to the point where the armature 81 comes within the field of attraction of the magnet 76 it will overcome the force of spring 68, and the arm 80 and with it the arm 51, and connected parts, will be caused to snap over until the arm 80 engages the end of the adjusting screw 82, which is the position for producing movement of the throttle to maximum speed operating position. Conversely, when reduction of pressure in chamber 34 through lowering of temperature in the compartment 31 brings about a movement of bellows 46 in reverse direction to a point where the force of the magnet is less than the force of spring 68, the reverse operation will take place and lever arm 80 will be snapped back to the position where the connecting lever system will move the throttle to produce minimum or idling speed of the motor.

I claim:

1. Temperature controlled means for shifting the throttle of a carburetor to either of two operative positions and holding it in the same position until a predetermined change in temperature takes place, comprising, an expansible fluid thermostat, a chamber connected to said thermostat, a bellows in said chamber whose exterior is subject to the pressure in said chamber and whose interior is open to the atmosphere, means connecting said bellows and said throttle for moving the latter between said two positions in response to changes of temperature ambient to said thermostat, and means including a magnet and a spring for moving said first named means between said two positions with a snap action and holding the same in one of said positions until a substantial change of temperature occurs in the region ambient to said thermostat.

2. Temperature controlled means for shifting the throttle of a carburetor to either of two positions and for holding it in the same position until a predetermined change in the temperature takes place, comprising, an expansible fluid thermostat, a chamber connected to said thermostat, a bellows in said chamber whose exterior is subject to the pressure in said chamber and whose interior is open to the atmosphere, means connecting said bellows and said throttle for moving the latter between said two positions in response to a change of temperature ambient to said thermostat, and snap acting means for holding said last named means in one of said positions until a substantial change of temperature occurs in the region ambient to said thermostat.

3. Temperature controlled means for shifting the throttle of a carburetor to either of two positions and holding it in the same position until a predetermined change in the temperature takes place, comprising, a bulb containing an expansible fluid, an expansible chamber connected to said bulb, means connecting said chamber and said throttle for moving the latter between said two positions in response to a change in temperature ambient to said bulb, and snap acting means for holding said last named means in one of said positions until a substantial change of temperature occurs in the region ambient to said bulb.

4. Temperature controlled means for shifting the throttle of an engine carburetor to either of two positions and holding it in the same position until a predetermined change in control temperature takes place, including a temperature responsive bulb containing an expansible fluid located in a space whose temperature is to be controlled, an expansible chamber connected to said bulb in such a manner as to be subject to movement by the change in volume of said fluid, means operatively connecting said chamber and said throttle for moving the latter between said two positions in response to a change of temperature in the space ambient to said bulb, and means for holding said last named means in one of said positions until a substantial change of temperature occurs in the region ambient to said bulb.

5. In a refrigeration unit embodying an evaporator, a compressor connected to the evaporator, an engine for driving the compressor, a fuel carburetor connected to said engine, a throttle vane associated with said carburetor for controlling the flow of fuel to the engine, said vane being movable between maximum and minimum flow control positions, temperature responsive means for controlling the movement of said vane, comprising a fluid filled bulb positioned in heat exchange relationship with the evaporator, an expansible chamber connected to said bulb in such a manner as to be subject to movement by the change in volume of said fluid, a linkage operatively connecting said chamber and said vane for moving the latter between maximum and minimum flow positions in response to a change of temperature ambient to said bulb, and delayed acting means for holding said linkage in one of said positions until a substantial change of temperature occurs in the region ambient to said bulb.

FREDERICK M. JONES.

REFERENCES CITED

The following references are of record in the file of this patent:

UNITED STATES PATENTS

| Number | Name | Date |
|---|---|---|
| 2,257,164 | Emwer | Sept. 30, 1941 |
| 2,286,758 | Nelson | June 16, 1942 |
| 2,336,735 | Jones | Dec. 14, 1943 |
| 2,337,926 | Raney | Dec. 28, 1943 |
| 2,400,665 | Thomas | May 21, 1946 |